Oct. 27, 1959                C. B. DE VLIEG                2,909,965
                              POWER TOOL LOCK
                            Filed Jan. 25, 1957
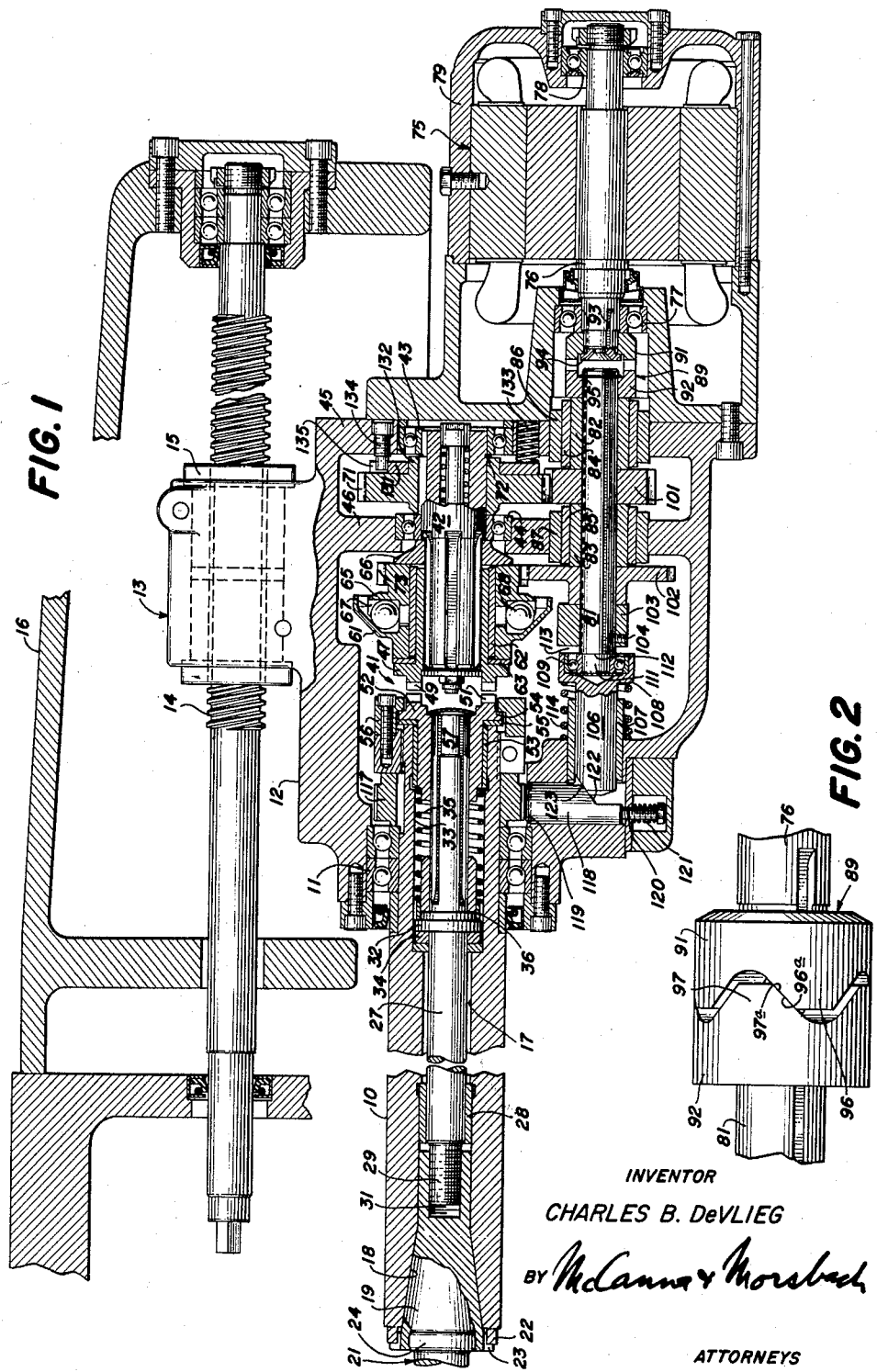
INVENTOR
CHARLES B. DeVLIEG
BY *McCanna & Morsbach*
                                                    ATTORNEYS

United States Patent Office 2,909,965
Patented Oct. 27, 1959

2,909,965

POWER TOOL LOCK

Charles B. De Vlieg, Bloomfield Hills, Mich., assignor to De Vlieg Machine Company, Detroit, Mich., a corporation of Michigan Application January 25, 1957, Serial No. 636,436

8 Claims. (Cl. 90—11)

This invention relates to mechanisms for locking in a tool spindle, and for releasing therefrom, a tool element such as an arbor, a tool chuck, a boring bar, a tool adapter, or any means for carrying a tool for boring, milling, drilling or other metal cutting or treating means.

The present invention particularly relates to improvements in tool locks of the type disclosed in the patents to C. B. De Vlieg No. 2,667,819 and 2,667,820. As disclosed in those patents, a mechanism such as a draw bar is provided in the spindle of the machine for locking the tool element therein and a power operated means is provided for rotating the draw bar relative to the spindle, to selectively lock or release the tool from the spindle. The torque applied to the draw bar during the locking-in and releasing of the tool from the spindle is transmitted to the spindle through the tool element and tends to rotate the spindle. Since the operator must support the tool when inserting and removing the tool from the spindle, the spindle must be locked against rotation during the locking-in and releasing operations.

A spindle lock mechanism is provided in the power tool lock disclosed in Patent 2,667,820, which spindle lock mechanism is arranged to be operated by the power operated tool locking means to lock the spindle against rotation during the locking in and releasing of the tool from the spindle. This spindle lock mechanism included a plunger engageable with the spindle to lock rotation thereof and a cam, driven through a friction clutch from the power operated tool locking means, for urging the plunger into locking engagement with the spindle. The force applied to the plunger to urge it to its spindle locking position is determined by the coupling of the friction clutch. As is well known, the coupling of such clutches is not only dependent upon the adjustment of the clutch, but also varies with the condition of the clutch surfaces and the presence or absence of foreign matter thereon, and further varies as the clutch becomes worn during use. In practice, it has been found that the aforementioned spindle lock mechanism has not been entirely satisfactory primarily due to the variations in the coupling of the friction clutch that occur during use. As the tool element is drawn into the spindle, the torque applied by the power operated tool locking means to the draw bar increases until the power operated motor stalls, at which time the operator deenergizes the motor. Since the torque applied to the draw bar is transmitted to the spindle and tends to cause rotation for the latter, the spindle locking means must be effective to oppose the relatively high torque applied to the spindle, particularly during that portion of the locking-in and releasing operations in which the tool is in its locked position and the power operated locking means is transmitting full torque to the spindle. Obviously, if the friction clutch is not properly adjusted, or becomes out of adjustment through use, or if the condition of the clutch faces vary due to wear, or the presence of foreign matter therebetween, the force transmitted through the friction clutch to the spindle lock plunger may be insufficient to reliably prevent rotation of the spindle, during the entire tool locking-in or releasing operations.

An important object of this invention is to provide a power operated tool lock having an improved spindle lock mechanism which is more positive and reliable in operation than the above-mentioned spindle lock mechanism and which overcomes the aforementioned difficulties due to variations in the friction clutch which occur during use.

Another object of this invention is to provide a power operated tool lock having a spindle lock mechanism operatively associated therewith and so arranged as to apply a locking force to restrain the spindle against rotation, which locking force is co-relative in magnitude with the torque applied to the spindle during the locking-in and releasing operations.

A more particular object of this invention is to provide a power operated tool lock having an improved spindle lock mechanism including a driven shaft which is operable to apply a locking force to the spindle which is co-relative with the torque applied by the power operated mechanism to the driven shaft and in which the tool draw bar is operated from the driven shaft so that the restraining torque on the tool draw bar is effective to increase the force applied by the spindle lock mechanism to lock the spindle against rotation.

These together with various ancillary objects and advantages of this invention will be more readily appreciated as the same becomes better understood by reference to the following detailed description when taken in connection with the accompanying drawings wherein:

Figure 1 is a longitudinal section of the spindle and tool locking mechanism with the driving mechanism for the tool locking mechanism disengaged therefrom; and Figure 2 is an enlarged side elevational view of the cam-type coupling for operating the spindle lock mechanism.

The tool locking mechanism of the present invention is adapted for use with a wide variety of machines to effect locking of a tool element in the spindle thereof. In the specific form illustrated, the spindle 10 of the machine is mounted for rotation and also for axial sliding movement and the tool locking mechanism is operatively associated with the spindle to move axially therewith. The forward end of the spindle is slidably and rotatably supported in a conventional manner on the machine and the rear end of the spindle is rotatably supported by bearings 11 in a housing 12 for the tool lock mechanism. The housing 12 is, in turn, slidably mounted on spindle head 16 of the machine for movement in a direction longitudinally of the spindle 10 and a mechanism 13 herein shown in the form of a lead screw 14 and lead screw nut assembly 15 is provided for moving the housing and spindle.

The spindle 10 is formed with an axially extending passage 17 which is enlarged at its outer end to provide a tool receiving socket 18. In locking a tool element to the spindle, it is desired to center the tool element with respect to the spindle and also positively lock the same against rotation. One suitable arrangement for effecting this result is illustrated in the drawings wherein the socket 18 is shown tapering outwardly to receive the correspondingly tapered shank 19 of the tool element 21. Lugs 22 are provided at the outer end of the spindle and cooperate with corresponding recesses 23 formed in the flange 24 on the tool shank. The tool locking mechanism is arranged to draw the tool element 21 into the socket, in a manner described more fully hereinafter, to thereby center the tool in the spindle and lock the tool against rotation. While a specific spindle and tool construction has been illustrated and described for effecting centering of the tool and locking of the tool against rotation, it is apparent that other arrangements may be utilized without departing from the spirit of the present invention.

The tool element 21 is arranged to be drawn into the socket 18 by means of a draw bar 27. As illustrated in the drawings, a draw bar 27 is mounted for rotation and axial sliding movement in the axial passage 17 in the spindle and is supported at its forward end in a bearing 28. The outer end of the draw bar is provided with an externally threaded portion 29 arranged to threadedly engage a socket 31 formed on the tool element to thereby draw the latter into the socket as the draw bar is rotated. While a threaded connection between the draw bar and tool shank is preferred, it is apparent that any other suitable means may be provided to effect connection between the draw bar and tool shank by power operation of the draw bar, without departing from the present invention. At its rear end, the draw bar 27 is formed with a stepped collar 32 disposed in an enlarged portion 33 of the passage 17 in the spindle, which collar is arranged to engage a thrust bearing 34 disposed in the passageway 33 in the spindle, to limit outward movement of the draw bar. A coiled compression spring 35 is disposed in the passage 33 in the spindle and has one end thereof in engagement with a ring 36, which abuts against the collar 32 on the draw bar and normally urges the latter against the thrust bearing 34 so that the threaded end of the draw bar is in the position it normally assumes when the tool 21 is locked in the spindle, as shown in Figure 1.

The draw bar 27 is selectively rotated, in either direction, to effect locking in or releasing of the tool element from the spindle, by means of a power operated mechanism. This power operated mechanism is operatively connected to the draw bar through a normally disengaged clutch mechanism 41, which clutch mechanism is automatically operated in a manner described hereinafter, to effect a driving connection between the drive mechanism and the draw bar. The clutch 41, as best shown in Figure 1, includes a shaft 42 rotatably supported by bearings 43 and 44 on the end wall 45 and partition 46, respectively, of the housing 12. The clutch drive element 47 is slidably and non-rotatably mounted on the splined end 48 of the shaft 42, and has axially extending dogs 49 arranged to cooperate with corresponding dogs 51 provided on the driven element 52. The driven element 52 is rotatably supported in the enlarged portion 33 of the passage in the spindle by means of a bearing 53 and has an outwardly extending flange 54 thereon which abuts against a thrust bearing 55 at the end of the spindle. A collar 56 is secured to the spindle and has an inwardly extending flange thereon engageable with the flange 54 on the driven element to prevent axial movement of the latter relative to the spindle. The driven element is internally splined and slidably and non-rotatably receives the corresponding externally splined portion 57 on the inner end of the draw bar 27 to effect rotation of the latter. The compression spring 35 is conveniently arranged to abut against the inner end of the driven member as is clearly shown in Figure 1.

In the embodiment illustrated, the drive member 47 is moved axially into engagement with the driven member by means of a centrifugally operated actuator. This actuator includes a generally bell shaped member 61 which is slidably and rotatably supported by a bearing 62 on the drive member for movement relative thereto. A thrust bearing 63 is interposed between the member 61 and the flange on the drive member 47. The centrifugal actuator also includes a carrier 65 rotatably supported on the bearings 62 and constrained against axial movement in a direction to the right, as viewed in Figure 1, by a collar 66. The carrier includes a plurality of outwardly opening pockets 67 which receive balls 68 arranged to be centrifugally operated outwardly to thereby cam the member 61 axially, in a direction to the left as viewed in Figure 1. The draw bar 27 is preferably rotated at a relatively low rate during the locking-in and releasing operations, and is driven through a gear 71 which is keyed to the shaft 42 and constrained against relative axial movement by engagement with the inner race of the bearing 44 at one side and by the locking ring 72 at the other side thereof. The carrier 65 of the centrifugal actuator is driven at a relatively higher rate of speed through a gear 73, conveniently formed integrally therewith.

The arrangement of the spindle, draw bar, tool locking mechanism thus far described is disclosed in the aforementioned patents to De Vlieg and reference is made thereto for a more complete description of the construction and operation of the same.

In accordance with the present invention, an improved spindle lock mechanism is provided, which spindle lock mechanism is automatically operated in response to operation of the tool lock mechanism, to lock the spindle against rotation before the tool lock mechanism is operative to rotate the draw bar to effect either locking-in or releasing of the tool from the spindle. In addition, the spindle lock mechanism is operatively related to the tool lock mechanism so as to apply a force for restraining rotation of the spindle which is co-relative in magnitude with the torque applied to the spindle by the tool lock mechanism during the locking-in and releasing operations. The tool lock mechanism previously described is conveniently selectively and reversibly operated by means of a motor 75 herein shown of the electrical type having "forward" and "reverse" switch means (not shown) for selectively controlling energization of the latter to effect rotation in either direction. The motor has an output drive shaft 76 supported in bearings 77 and 78, which drive shaft is offset from the shaft 42 of the tool lock mechanism. As is apparent from Figure 1, the bearings 77 and 78 are supported on a housing 79 attached to the housing 12 and movable therewith in a direction longitudinally of the spindle 10.

An externally splined driven shaft 81 is mounted for axial sliding and rotary movement in alignment with the drive shaft 76, and provision is made for effecting locking of the spindle against rotation in response to axial movement of the driven shaft. In the embodiment illustrated, spaced rings 82 and 83 are mounted on the driven shaft and are rotatably supported by bearings 84 and 85 on collars 86 and 87 respectively carried by the end wall and partition 45 and 46 of the housing 12. Axial movement of the driven shaft is effected in response to operation of the motor 75, in either direction of rotation, by means of a coupling member 89 comprising drive and driven members 91 and 92 respectively. The drive member 91 is non-rotatably mounted on the splined end 93 of the drive shaft 76. The coupling member 91 abuts against the inner race of the bearing 77 and is restrained thereby from movement to the right, and a stud 94 is threaded into the drive shaft and engages the drive member 91 to retain the latter on the drive shaft. The driven member 92 is non-rotatably mounted on the splined driven shaft 81 and is retained thereon by a split ring 95. The coupling members 91 and 92 are formed with interengaging teeth 96 and 97 (see Fig. 2) respectively which provide a driving connection therebetween to effect rotation of the driven shaft 81 with the drive shaft 76. The teeth 96 and 97 are formed with oppositely inclined interengaging faces 96a and 97a respectively which, in effect, form cam surfaces which tend to urge the drive and driven members axially away from each other when the members are rotated relative to each other. The slope of the inter-engaging faces 96a and 97a is made relatively steep to provide a relatively high separating force, and, in the specific form shown the slope of the inter-engaging faces is of the order of 45 degrees.

It is apparent that the separating force between the drive and the driven members 91 and 92 is dependent upon the torque applied by the drive member to the driven member and increases in proportion to the torque. It is a feature of the present invention that the tool locking mechanism is driven from the shaft 81 so that the torque required to operate that mechanism is effective to increase the separating force between the drive and driven members 91 and 92. Moreover, since the torque required to rotate the draw bar 27 increases to a maximum value equal to the stalling torque of the motor, when the tool element becomes seated in the socket 18, it is apparent that the separating force between the drive and driven members also increases when the tool becomes seated. Since the torque applied to the draw bar 27 also tends to rotate the spindle 10, it is apparent that the separating force between the drive and driven members increases in proportion to the torque applied to the spindle. In this manner, the force applied to lock the spindle against rotation automatically increases in proportion to the torque applied to the spindle during the locking-in and releasing operations and which tends to cause the latter to rotate.

The draw bar drive is established from a gear 101 non-rotatably mounted on the splined driven shaft 81 and interposed between the rings 82 and 83 thereon. The centrifugal actuator is driven from a gear 102, also non-rotatably mounted on the splined driven shaft 81, which gear meshes with the gear 73 on the carrier 65. The gear 102 abuts, at one side thereof, against the ring 83 and a collar 103 is rigidly secured to the driven shaft 81 by a set screw 104, which collar retains the gear 102, ring 83, the gear 101 and the ring 82 in assembled relation on the shaft and in abutting end to end relation with each other and with the driven member 92. It is thus apparent that the axial thrust on the driven member 92 is transmitted through the ring 82, gear 101, ring 83, and gear 102 to the collar 103. Alternatively, it is apparent that the driven member 92 could be rigidly secured to the shaft so that the axial thrust on the driven member would be transmitted entirely through the shaft.

The axial movement of the driven shaft 81 is utilized to operate the spindle lock. For this purpose, a shank 106 is slidably mounted in a bearing 107 in the front wall of the housing 12, for axial movement in alignment with the driven shaft 81. The shank has a bearing cup 108 formed on one end thereof which receives a bearing 109. The inner race of the bearing 109 is mounted on a reduced diameter extension 111 on the end of the driven shaft 81, which inner bearing race abuts against a shoulder 112 formed on the shaft. A ring 113 is disposed on the shaft between the collar 103 and the inner race of the bearing 109 to transmit the axial thrust on the collar to the inner race of the bearing. In this manner, the axial thrust produced by the separating forces between the drive and driven members 91 and 92 is transmitted to the shank 106 and urges the latter to the left as viewed in Figure 1. A spring 114 is interposed between the end wall of the housing and the bearing cup 108, to normally urge the latter to the right, toward its release position as viewed in Figure 1.

In the specific embodiment illustrated, a ratchet gear 117 is non-rotatably keyed to the spindle 10 and a plunger 118 having a toothed end 119 is mounted for reciprocation along a path disposed radially of the ratchet gear for movement into and out of engagement therewith. A stem 120 is provided on the other end of the plunger and a coil spring 121 is disposed around the stem and engages the head thereon to yieldably urge the plunger to its retracted position. A cam face 122 is formed on the plunger 118 and is inclined to a plane extending transversely thereof, which cam face is arranged to cooperate with a complementary cam face 123 formed on the end of the shank 106. As is apparent, axial movement of the shank 106 effects cam operation of the plunger 118 into engagement with the ratchet gear 117, to lock the spindle 10 against rotation. As disclosed in the aforementioned patents to C. B. De Vlieg, the ratchet gear 117 and plunger 118 have beveled inter-engaging teeth which tend to urge the plunger away from the ratchet gear, when a high torque is applied to the spindle 10. In order to overcome this separating force between the ratchet gear and plunger, the angle of the cam face 122 is made relatively shallow and preferably less than 45 degrees to a plane perpendicular to the plunger. In the form herein shown, the cam face 122 extends at an angle of approximately 35 degrees to a plane normal to the direction of movement of the plunger.

In order to assure that there will be adequate torque transmitted from the drive member 91 to the driven member 92, to effect separation of the latter and locking of the spindle against rotation, prior to operation of the tool locking means, there is provided a brake means for retarding the rotation of the driven shaft 81. Since the driven shaft 81 is mounted for axial movement, the brake means is arranged to retard rotation of the shaft 42 which, through gears 71 and 101, retards rotation of the shaft 81. The brake means conveniently comprises an annular disk 131 rotatably supported on a hub 132 on the gear 71. The disk is yieldably urged into engagement with the side face of the gear by annularly spaced compression springs 133 and a pin 134 is mounted in the end wall 45 of the housing and slidably extends into an opening 135 in the disk, to constrain the latter against rotation. In this manner, a constant braking force is applied to the gear 71 which is effective to retard rotation of the driven shaft 81.

From the foregoing it is thought that the operation of the device will be readily understood. When no tool is disposed in the spindle, the clutch mechanism 41 is disengaged, the draw bar is in its extended position and the plunger 118, in its retracted position. When it is desired to lock a tool in the spindle, the shank of the tool is inserted into the spindle until the lugs 22 thereon extend into the notches 23 in the flange on the tool element. The draw bar 27 is moved axially inwardly, against the bias of the compression spring 35. The operator then presses the "forward" button to energize the motor 75 in the forward direction and rotate the drive shaft 76. Since the rotation of the driven shaft 81 is retarded by the brake mechanism previously described, the torque applied by the drive element 91 to the driven element 92 will produce an axial separating force therebetween which urges the driven element to the left, as viewed in Figure 1. The axial thrust on the driven element is transmitted through the ring 82, gear 101, ring 83, shaft 81, collar 103, ring 113, and bearing 109 to the shank 106, which shank is moved axially, against the bias of the compression spring 114, to the left as viewed in Figure 1. The cam face 123 on the shank 106 engages the cam face 122 on the plunger 118 and urges the latter upwardly, against the bias of the spring 121, and into engagement with the teeth of the ratchet gear 117, to thereby lock the spindle 10 against rotation. Since the driven shaft 81 is free to rotate relative to the shank 106, the motor 75 is thereafter operative to drive the tool lock mechanism through the gears 101 and 71, and to also operate the centrifugal actuator through gears 102 and 73. The gear ratio of the gears 102 and 73 is such that the carrier 65 is rotated at a high rate of speed so that the centrifugal actuator rapidly moves the drive member 47 of the clutch into engagement with the driven member 51 to establish a driving connection between the shaft 42 and the draw bar 27. The draw bar is then rotated at a relatively low speed, determined by the gear ratio of the gears 101 and 71 and threads into the internally threaded portion 31 on the tool element to draw the latter into the spindle 10. When the tool element becomes seated in the socket 18 in the spindle, the torque required to rotate the draw bar 27 increases rapidly until the motor 75 is stalled. Since the tool element cannot rotate relative to the spindle 10, it is apparent that the torque applied to the draw bar is transmitted to the spindle 10 and tends to cause rotation of the latter. This torque applied to the spindle becomes relatively high, at the time when the motor 75 becomes stalled. However, since the increased torque also increases the separating force between the drive and driven members 91 and 92, it is apparent that the force applied to the plunger 118 to effect locking of the latter against rotation, also increases. Since the force applied to the plunger 118 is proportional to the torque applied to the spindle 10, it is apparent that the spindle lock mechanism will reliably lock the spindle against rotation.

When the motor 75 becomes stalled, the rotation of the carriers 65 of the centrifugal actuator is interrupted. However, as disclosed in the aforementioned DeVlieg patents, the angle of the inter-engaging faces of the clutch is made such that the frictional contact therebetween is sufficient to maintain the drive member in engagement with the driven member, until the motor is deenergized. As soon as the operator senses that the motor has stalled, he releases the "forward" button to stop the motor. The clutch 41 then becomes disengaged and the spring 114 is operative to move the shank 106 and driven shaft 81 to the right whereupon the spring 121 is effective to return the plunger 118 to its disengaged position.

In order to release a tool from the spindle, the motor is operated in the reverse direction by pressing the "reverse" button to thereby rotate the drive shaft 77 in the opposite direction. The coupling members 91 and 92 are also operative, in the reverse direction or rotation of the motor 75, to urge the driven shaft 81 to the left with a force proportional to the torque applied by the drive member to the driven member. Accordingly, the aforementioned sequential locking of the spindle against rotation and operation of the tool lock mechanism is generally the same as occurs during the locking-in operation, except that the shaft 42 and consequently the draw bar 27 is rotated in the reverse direction through the clutch 41 to thereby effect release of the tool element.

I claim:

1. In a tool locking mechanism, the combination of a spindle having a socket for receiving the tool, tool moving means mounted on the spindle operative to move the tool into the spindle socket to be seated therein, motor means including a drive shaft coupled by a driving connection to the tool moving means operative to effect operation of the tool moving means upon rotation of the drive shaft, a driven shaft mounted for axial sliding and rotary movement, said driven connection including coupling means for driving said driven shaft and including cam means for moving said driven shaft axially in response to rotation of said drive shaft by said motor means in either direction of rotation, and spindle lock means operative in response to the axial movement of said driven shaft produced by rotation of said drive shaft for locking said spindle against rotation during operation of said motor means.

2. In a tool locking mechanism, the combination of a spindle having a socket for receiving the tool, tool moving means mounted on the spindle operative to move the tool into the spindle socket to be seated therein, motor means including a drive shaft coupled by a driving connection to the tool moving means operative to effect operation of the tool moving means upon rotation of the drive shaft, a driven shaft mounted for axial sliding and rotary movement, said driving connection including coupling means for driving said driven shaft and including cam means for moving said driven shaft axially when said drive shaft is turned relative to said driven shaft, brake means operative to retard rotation of said driven shaft sufficient to cause angular displacement of said drive shaft relative to said driven shaft in response to rotation of said drive shaft by said motor means in either direction of rotation, and spindle lock means operative in response to the axial movement of said driven shaft for locking said spindle against rotation during operation of said motor means.

3. In a tool locking mechanism, the combination of a spindle having a socket for receiving the tool, tool moving means mounted on the spindle operative to move the tool into the spindle socket to be seated therein, motor means including a drive shaft coupled by a driving connection to the tool moving means operative to effect operation of the tool moving means upon rotation of the drive shaft, a driven shaft mounted for axial sliding and rotary movement, said driving connection including coupling means for driving said driven shaft and including cam means for moving said driven shaft when said drive shaft is turned relative to said driven shaft, brake means for retarding rotation of said driven shaft sufficient to cause angular displacement of said drive shaft relative to said driven shaft axially in response to rotation of said drive shaft by said motor means in either direction of rotation, a shank mounted for axial sliding movement in alignment with said driven shaft, bearing means rotatably interconnecting said shank and said driven shaft to effect axial movement of the shank with the driven shaft while permitting relative rotation therebetween, and spindle lock means operative in response to axial movement of said shank for locking said spindle against rotation.

4. In a tool locking mechanism, the combination of a spindle having a socket for receiving the tool, a draw bar operative upon rotation relative to the spindle to draw the tool into the spindle socket to be seated therein, motor means including a drive shaft, a driven shaft mounted for axial sliding and rotary movement, means connecting said driven shaft to said draw bar to effect rotation of the latter in response to rotation of said driven shaft, a coupling between said drive and driven shafts for drivingly interconnecting the same and including cam means for moving said driven shaft axially in response to rotation of said drive shaft in either direction of rotation, and spindle lock means operative in response to the axial movement of said driven shaft produced by rotation of said drive shaft for locking said spindle against rotation during operation of said motor means.

5. In a tool locking mechanism, the combination of a spindle having a socket for receiving the tool, a draw bar operative upon rotation relative to the spindle to draw the tool into the spindle socket to be seated therein, motor means including a drive shaft, a driven shaft mounted for axial sliding and rotary movement, means connecting said driven shaft to said draw bar to effect rotation of the latter in response to rotation of said driven shaft, a coupling between said drive and driven shafts for drivingly interconnecting the same and including cam means for moving said driven shaft axially in response to rotation of said drive shaft in either direction of rotation, a shank mounted for axial sliding movement in alignment with said driven shaft, bearing means rotatably interconnecting said shank and said driven shaft to effect axial movement of the shank with the driven shaft while permitting relative rotation therebetween, and spindle lock means operative in response to axial movement of said shank.

6. In a tool locking mechanism, the combination of a spindle having a socket for receiving the tool, a draw bar operative upon rotation relative to the spindle to draw the tool into the spindle socket to be seated therein, motor means including a drive shaft, a driven shaft mounted for axial sliding and rotary movement, means connecting said driven shaft to said draw bar to effect rotation of the latter in response to rotation of said driven shaft, a coupling between said drive and driven shafts including drive and driven members on said drive and driven shafts respectively, said drive and driven members including interengaging teeth for drivingly interconnecting said shafts and having cam faces shaped to urge the driven member axially away from the drive member with a force proportional to the torque exerted by the drive member on the driven member, brake means for retarding rotation of the driven shaft sufficiently to assure that the torque applied by the drive member to the driven member to effect rotation of the driven shaft will effect axial movement of the driven shaft, and spindle lock means operative in response to axial movement of the driven shaft for locking said spindle against rotation during operation of said motor means.

7. In a tool locking mechanism, the combination of a spindle having a socket for receiving the tool, a draw bar operative upon rotation relative to the spindle to draw the tool into the spindle socket to be seated therein, motor means including a drive shaft, a driven shaft mounted for axial sliding and rotary movement, means connecting said driven shaft to said draw bar to effect rotation of the latter in response to rotation of said driven shaft, a coupling between said drive and driven shafts including drive and driven members on said drive and driven shafts respectively, said drive and driven members including interengaging teeth for drivingly interconnecting said shafts and having cam faces shaped to urge the driven member axially away from the drive member with a force proportional to the torque exerted by the drive member on the driven member, brake means for retarding rotation of the driven shaft sufficiently to assure that the torque applied by the drive member to the driven member to effect rotation of the driven shaft will effect axial movement of the driven shaft, a shank mounted for axial sliding movement in alignment with said driven shaft, bearing means rotatably interconnecting shank and said driven shaft to effect axial movement of the shank with the driven shaft while permitting relative rotation therebetween, and spindle lock means operative in response to axial movement of said shank.

8. In a tool locking mechanism, the combination of a spindle having a socket for receiving the tool, a draw bar within said spindle operative for rotation relative to the spindle to draw the tool into the spindle socket to be seated therein, a shaft non-slidably and rotatably mounted in alignment with said spindle, a normally disengaged centrifugally operated clutch means for effecting a driving connection between said shaft and said draw bar at the end of said spindle opposite said socket, motor means including a drive shaft offset from said draw bar, a driven shaft mounted for axial sliding and rotary movement in alignment with said drive shaft, means drivingly connecting said driven shaft to the shaft aligned with the draw bar, a coupling between said drive and driven shafts including drive and driven members having interengaging teeth for drivingly interconnecting said members, said teeth having cam faces shaped to urge the driven member axially away from the drive member with a force proportional to the torque exerted by the drive member on the driven member, said first mentioned shaft having a member mounted thereon for rotation therewith, brake means engaging said last mentioned member for retarding rotation thereof whereby to effect axial movement of said driven shaft when said drive shaft is rotated, and spindle lock means operative in response to the axial movement of said driven shaft for locking said spindle against rotation.

References Cited in the file of this patent

UNITED STATES PATENTS

| | | |
|---|---|---|
| 2,554,445 | Miller | May 22, 1951 |
| 2,667,820 | De Vlieg | Feb. 2, 1954 |